Aug. 8, 1944.　　　J. T. LOVE ET AL　　　2,355,090
INTERNAL COMBUSTION ENGINE
Filed April 6, 1939　　　5 Sheets-Sheet 1

Inventor:
John T. Love
Abe Lawrence Hoffman

Aug. 8, 1944.   J. T. LOVE ET AL   2,355,090
INTERNAL COMBUSTION ENGINE
Filed April 6, 1939   5 Sheets-Sheet 3

Inventors:
John T. Love.
Abe Lawrence Hoffman
By Mann, Brown & Cox
Attys.

Aug. 8, 1944.  J. T. LOVE ET AL  2,355,090
INTERNAL COMBUSTION ENGINE
Filed April 6, 1939   5 Sheets-Sheet 5

Inventors:
John T. Love
Abe Lawrence Hoffman
By Mann, Brown & Co.
Attys

Patented Aug. 8, 1944

2,355,090

UNITED STATES PATENT OFFICE 2,355,090

INTERNAL-COMBUSTION ENGINE

John T. Love and Abe Lawrence Hoffman, Chicago, Ill.

Application April 6, 1939, Serial No. 266,240

20 Claims. (Cl. 123—119)

The invention relates generally to internal combustion engines and more particularly to carburetion and to the regulation and control of the several elements entering into and making up the combustible mixture used in the engine.

Assuming that the ignition and the moving parts in an internal combustion engine are in perfect condition and that the carburetor should atomize all the fuel delivered to the draft, it is only because the mixture fails to be completely homogenized at the time the ignition spark occurs that the chemically perfect combustion mixture, which otherwise is theoretically ideal, is not so ideal in practice. However, with increased efficiency of atomization, the theoretically perfect combustion may be more closely approached, it being one of the objects of the present invention to provide a means whereby a perfect combustible mixture or any constant degree of variation therefrom will be supplied to the engine under all operating conditions thereof so that a perfect combustible mixture can be attained when the art of carburetion has advanced sufficiently to provide complete homogenization of fuel and air. Yet the present invention can be used with the less efficient carburetors and manifolds of the present day to provide as perfect a combustible mixture as such carburetors or any future improvements of them will permit.

In order, however, to attain an absolute control over perfect combustion, or any degree thereof, many work requirements of the engine must be considered. A change in speed of the motor varies the venturi action in the carburetor and, therefore, the relative mixture of fuel and air. Moreover, there is no direct relation between the power of the engine, the speed of the engine, and the amount of the throttle opening. For this reason there is no one of the foregoing factors which can be utilized to control the proportions of combustible elements. In fact, two major conditions of engine operation diametrically oppose each other. If a vehicle is moving under a light load on the level, the throttle is nearly closed and the power of the engine will be low with the manifold vacuum very high. On the other hand, if a vehicle is making a climb with a heavy load the engine runs slowly and the throttle is wide open. In the last case, the vacuum in the manifold is low and the draft of air therethrough is too slow to deliver the mixture which it needs to give maximum power.

Consequently, it is an object of the invention to provide any selected constant combustion condition which will pertain throughout the various work and environment conditions to which an internal combustion engine is subject in operation, among which are acceleration, speed changes, load changes, throttle changes, and atmospheric changes.

In addition to the lack of a direct relationship between the power, speed and throttle opening, the relative barometric pressure under which the engine is operating introduces an additional variant to the already complex problem. This leads to a consideration of the work factors which are particularly significant to air craft.

In air craft propelled by internal combustion engines, it is highly important that utmost fuel economy be exercised for two reasons. In commercial air transportation it is significant that an increase of pay-loads is made possible by decreasing the amount of fuel load needed for a given flight. The second reason is related to increased distances which are made possible by the proper conservation of fuel.

The change of atmospheric pressure with altitude varies the volumetric efficiency of the carburetion and through this the power output of the motor.

It is one of the objects of the present invention to provide a perfect mixture or any constant predetermined degree of deviation from a perfect mixture under all changes in atmospheric conditions and working conditions to which an internal combustion engine is subjected.

A further object of the invention is to provide an improved carburetor for aeroplanes whose air capacity is increased in direct relationship to the presence of carbon monoxide or like gases in the exhaust of the engine.

Another object of the invention is to provide a combustion efficiency which reduces carbon deposits, lessens the number of engine overhauls, raises the power output and greatly lessens or determines the danger of carbon monoxide in relatively closed places.

Another object of the invention is to provide an improved fuel economizer which is simple in operation, easy to adjust to attain certain selected results, and inexpensive to manufacture and install.

These being among the objects of the invention, other and further objects will appear from the drawings, the description relating thereto and the appended claims.

Referring now to the drawings.

Although the principle of mixing exhaust gases of combustion with free air and burning the resulting mixture to detect carbon monoxide is old and although this principle has been employed in connection with a thermostat located in the path of such burning products of recombustion and connected to the carburetor directly to vary or control the proportion of the elements of combustion entering the engine, yet it will be appreciated that the prior devices fall short of providing a perfect mixture. The thermostat is subject to its own inefficiency. To illustrate:

If there was 10% carbon monoxide present in the exhaust gases and in response to the heat of recombustion the thermostat moved the carburetor to supply a mixture in which there was only 1% of carbon monoxide, once that mixture was attained the thermostat would no longer be subjected to the original impulse and would cool. The thermostat would then move back and thereby increase the richness of the mixture. As a result, heat of combustion would be produced again and once more the thermostat would be actuated to lean the mixture. This process might be repeated a great number of times with the ultimate result of a carbon monoxide percentage some place between the 10% and the 1%. At no time after "hunting" would the thermostat provide a mixture acceptably free of carbon monoxide. More likely in the hypothetical case, the percentage would be between 4% and 6%.

If the adjustment on the thermostat was such that the thermostat would "hunt" to ultimate perfect combustion, then when it first responded to the 10% carbon monoxide such as might develop when the engine was choked, the thermostat would go to a negative position and lean the mixture enough to cause misfire and once misfire develops the unburned gas would be delivered into the exhaust where it would upset the significance of the thermostat's response, since by being burned there it would cause the thermostat to respond in the same manner as to the presence of burning carbon monoxide. As a consequence of the burning of this raw fuel the thermostat would move further towards lean and cause further misfires. Misfires upon aeroplanes are highly dangerous for various and well known reasons.

Although the prior devices just mentioned have served a useful function where there has been a wide range of carbon monoxide tolerance as there has been in the past due to inefficiencies in carburetor homogenizations, present and future developments and improvements in carburetors resulting in more perfect homogenization outmode the prior fuel economizers.

Referring now to the drawings in detail, the embodiment of the invention illustrated may be used with any one of a number of conventional carburetors since these carburetors, more or less, provide a determined curve of fuel proportions of combustible mixture for engine operation under varying work conditions. However, it will be appreciated that the present invention may be employed with less complex carburetors where the engine is not subjected to rapidly varying conditions such as the conditions to which an automobile engine is subjected, namely, sudden acceleration, sudden hill and load conditions and quick starting conditions. A more simple carburetor would work just as effectively with the present invention as a complex carburetor in instances where an internal combustion engine would be used on a transport plane or a long flight plane or a gas-electric installation where the engine conditions vary gradually and split second change in performance is not required.

Figures 1, 4, 5, 7:
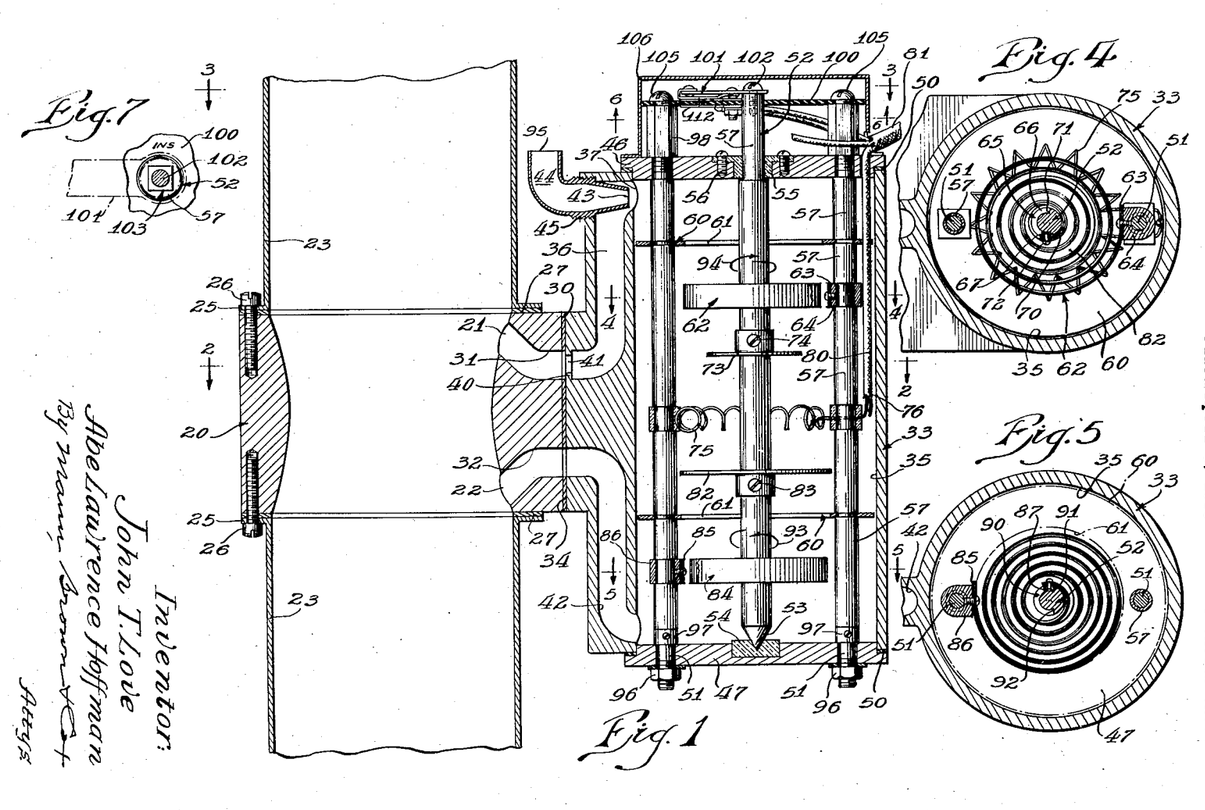
Fig. 1 is a vertical section taken through that portion of the invention which relates to determining carbon monoxide content of the exhaust gases coming from an internal combustion engine.
Fig. 4 is a section taken on the lines 4—4 in Fig. 1.
Fig. 5 is a section taken on the lines 5—5 in Fig. 1.
Fig. 7 is a section showing the manner in which the movable electric contact arm is mounted on the thermostatically controlled shaft shown in Fig. 1.

In the particular embodiment illustrated in Fig. 1, a Venturi collar 20 provided with an upstream inlet 21 and a downstream outlet 22 is inserted between two sections of an exhaust pipe 23 leading from the exhaust manifold 24 (Fig. 12) of an internal combustion engine which uses a fuel mixture such as gasoline and air. The exhaust pipe 23 is flanged as at 25 and the flange is apertured to receive bolts 26 which are threaded into the Venturi collar 20 with gaskets 27 provided between the flanges and the face of the collar to seal the unions against the leakage of exhaust gases.

The collar 20 is faced laterally at one side as at 30 where inlet and outlet passageways 31 and 32, respectively, open at spaced points according to a predetermined pattern which assures the proper installation of the device in correct relation with the flow of gases in the exhaust pipe. Thus, the collar 20 may be made in different sizes for different size exhaust pipes so long as the openings of the passageways 31 and 32 are so located upon the face 30 that there is only one way of installing the device operated by the exhaust gases received through the passageway 31.

The Venturi construction is such as not to create any substantial back pressure upon the engine, yet provides for a pressure differential between the collar opening 21 on the pressure upstream side of the venturi and the slight vacuum developed at the opening 22 on the downstream side of the venturi. Thus, gas may be diverted from the exhaust of an internal combustion engine and subjected to a double pressure component, namely, the pressure on the upstream side of the venturi and vacuum upon the downstream side whereby a rapid and positive flow of gases is induced through any device connecting the two passageways 31 and 32.

In the preferred embodiment of the invention, a casting 33 is provided having a face 34 that mates in only one way with the face 30 upon the collar 20. The casting 33 is constructed with a substantially large cylindrical bore 35 through the main portion thereof and open at both ends. In coring the casting 33 a passage 36 opening into the cylindrical bore, as at 37, is provided with a wall 40 at the other end thereof where the passage 36 will normally mate with the passage 31 in the collar. The wall 40 is drilled out as at 41 to provide a restricted aperture. The restricted aperture 41 may be of any size desired to control the rate of flow of gas to the cylindrical bore depending upon the rapidity or reactance with which the invention will be expected to operate to control the combustible mixture. Although this aperture may be a venutri which above a certain pressure differential maintains the flow of gas therethrough substantially constant, we have chosen to show a sharp edged aperture which will permit the speed of the gas flowing therethrough to be somewhat in direct relation with the speed of exhaust gases flowing through the exhaust pipe 23. This arrangement more or less permits the rapidity of control to vary with the speed or load of the motor as indexed by the amount of gas which flows through the exhaust pipe 23 in a given period of time.

A second passageway 42 is cored in the casting 33 to remove gas from the bore 35 and return it to the exhaust pipe through the outlet passageway 32. The passageway 42 may be of any size desired to maintain the bore 35 under slight vacuum so that outfiltration of gas from the bore 35 is prevented.

The restricted mouth 43 of a tube 44 leading to the outside atmosphere is located adjacent the opening 37 in the inlet passage 36 of the casting 33 with the tube threaded into the casting as at 45. With this construction, exhaust gases flowing into the bore 35 through the opening 37 draw fresh air from the mouth 43 as it passes into the bore 35 to mix oxygen with any carbon monoxide and unburned combustibles present in the exhaust gases.

Both ends of the casting 33 are faced to receive end walls or heads 46 and 47 with gaskets 50 to make of the bore 35 a sealed compartment. Two rods 51 threaded at both ends hold the heads 46 and 47 in place and the heads in turn support the rods in spaced and parallel relationship.

A central shaft 52 is rotatably mounted between and parallel with the rods 51. At the bottom thereof the shaft 52 is tapered to a point, as at 53, to provide a needle-point bearing with a conically apertured piece of quartz 54 secured to and carried by the end wall or head 47. The top of the shaft 52 is reduced in diameter as at 57, and is journalled in and extends beyond a collar 55 of masonite secured to the head 46 by machine screws 56. Upon the rods 51 and the shaft 52 the working parts employed in the invention are preferably assembled and spaced from each other by suitable sleeves 57 which slide upon the rods 51.

Spaced from the head 46 a baffle 60 is supported upon the rods 51 with a large central aperture 61 therethrough. This baffle assures a sufficient mixing of the exhaust gases and air coming through opening 37 to provide a recombustible mixture if carbon monoxide is present. Beyond the opening 61 the recombustible mixture flows through and in contact with a spiral thermostat 62 that is rigidly mounted at its outer end 63 to a collar 64 on one of the rods 51 and slidably mounted by a loose, slack take-up coupling 65 at its inner end on shaft 52.

The take-up coupling 65 comprises a boss 67 secured to the inner ends 70 of the thermostat and slides between the shoulders 71 and 72 at the ends of the groove 66. The shoulder 72 is engaged by the boss 67 when the thermostat is heated a predetermined degree by the gases flowing in heat transfer relationship therethrough. The groove 66 provides for movement of the boss 67 when the thermostat cools below a predetermined point. In this way there is no relative strain between the shaft 52 and the thermostat except when the thermostat is heated and is cooled beyond predetermined limits.

Below the thermostat 62 a disk 73 having a relatively small diameter is mounted upon the shaft 52 by a set screw 74 and below the disk 73 a glow coil 75 is mounted. The glow coil 75 is made preferably of platinum and is heated to a cherry red from an electrical circuit 76, the lead wires of which are covered with asbestos covering 80 where they run through the head 46 and the bore 35. The platinum wire serves as an ignition and a non-corrosive catalyst in conjunction with water vapor present in the exhaust gases although nichrome wire is satisfactory for cheaper installations.

Below the coil 75 a relatively large disk baffle 82 is mounted upon the shaft 52 and adjustably secured thereto by set screw 83. Below the baffle 82 a second baffle 60 is mounted upon the rods 51 and below the opening 61 of the second baffle 60 a second thermostat 84 is mounted and secured to the other of the rods 51 at its outer end 85 by means of a collar 86. The inner end of the thermostat 84 is secured to the shaft 52 in a manner similar to the first thermostat 62 except that the boss 87 which slides in a groove 90 engages the shoulder 91 when the thermostat 84 is heated above a predetermined point, while the shoulder 92 is engaged by the boss 87 when the thermostat is cooled below a predetermined point. The shoulder 91 corresponds to the shoulder 72 and it will be seen that the bosses 67 and 87 slide in their respective grooves 66 and 90 in opposite directions relative to the shaft 52 when the temperatures of the two thermostats change in the same direction, that is, when both either increase in heat or both cool at the same time, and conversely, the bosses exert a force in the same direction when the temperature differential between the thermostats changes.

The boss 67 and the shoulder 72 are preferably so constructed and arranged that they are in engagement with each other for all temperatures developed in the mixed air and gases after the engine is warmed up, although in certain embodiments of the invention it is feasible to have the thermostat act upon the rod 52 during the warming up period also. In operation, the thermostat 62 responds to the temperature of the gas and air mixture coming through the opening 37, less the loss of temperature due to the radiation in the casting 33. This locates or "sets" the shaft 52 for purposes now to be discussed.

After the mixture of air and gas passes through the thermostat 62 it comes into contact with the heated coil 75 where it not only absorbs temperature therefrom but is ignited thereby if there is any carbon monoxide present in the mixture. This burning takes place in a well known manner whereby any carbon monoxide present is burned with a corresponding increase in temperature in the resulting reburned gases in proportion to the degree of carbon monoxide present in the exhaust gases.

The reburned gas then passes over the thermostat 84 to convey to it not only the temperature to which the first thermostat was subjected, but also those temperature increments which arise from the burned carbon monoxide, and the heat of the glow coil. In this connection the thermostats are constructed to have a temperature-responsive differential between them to allow for the temperature added by the heat of the coil, and their combined action upon the shaft 52 will be normal when there is no carbon monoxide present in the exhaust gas.

Thus by the opposite rotational force exerted upon the shaft 52 by the thermostats the shaft 52 is rotated finitely in relation to the degree of carbon monoxide being burned. Once the boss 67 positions the shaft 52 by engagement with the shoulder 70 in response to the temperature of the mixture and air, any added temperature due to carbon monoxide will cause the thermostat 84 to rotate the shaft 52 in the direction of the arrow 93 against the thermostat 62. On the other hand, whenever the presence of carbon monoxide lessens the thermostat 84 cools and relaxes to permit the thermostat 62 to return the shaft 52 towards the starting or "set" position, the direction of rotation of the shaft 52 then being in the direction of the arrow 94.

In normalizing the position of the shaft 52 to a point where there is no carbon monoxide being burned preliminary to placing the device in operation, the opening 95 in the air intake tube 44 is closed. Any carbon monoxide present will not be burned by the heated coil in the absence of oxygen and the device therefore, can be adjusted to a normal starting point to include the coil heat increment regardless of the amount of carbon monoxide existing in the exhaust bases during the adjustment. After the adjustment has been made the opening 95 is opened and the mixture of carbon monoxide with oxygen is thereby effected, the carbon monoxide is burned, the thermostats go into operation to detect the temperature increment traceable to the presence of the carbon monoxide in the exhaust gases. This provides a simple means for accomplishing the adjustment and accuracy desired.

By way of being sure the device will operate accurately, the nuts 96 may be removed, the lower head 47 freed and the whole assembly lifted out as a unit at the top for experimentation, repair and adjustment. The lock collars 87 upon the rods 51 hold the sleeves 57 and assembled parts in their proper relation.

Upon the upper ends of the rods 51, hexed nuts 98 of elongated contour support an insulating plate 100 in spaced relation from the head 46. The reduced portion 57 of the shaft 52 extends through the insulating member 100, and upon the outer end of the reduced portion 57 an arm 101 is rigidly secured by a screw 102. As more particularly shown in Fig. 7, the arm 101 is supported against relative movement on the shaft 52 by a rectangular mating drive 103 between the shaft 52 and the arm 101.

Figures 2, 3, 6:
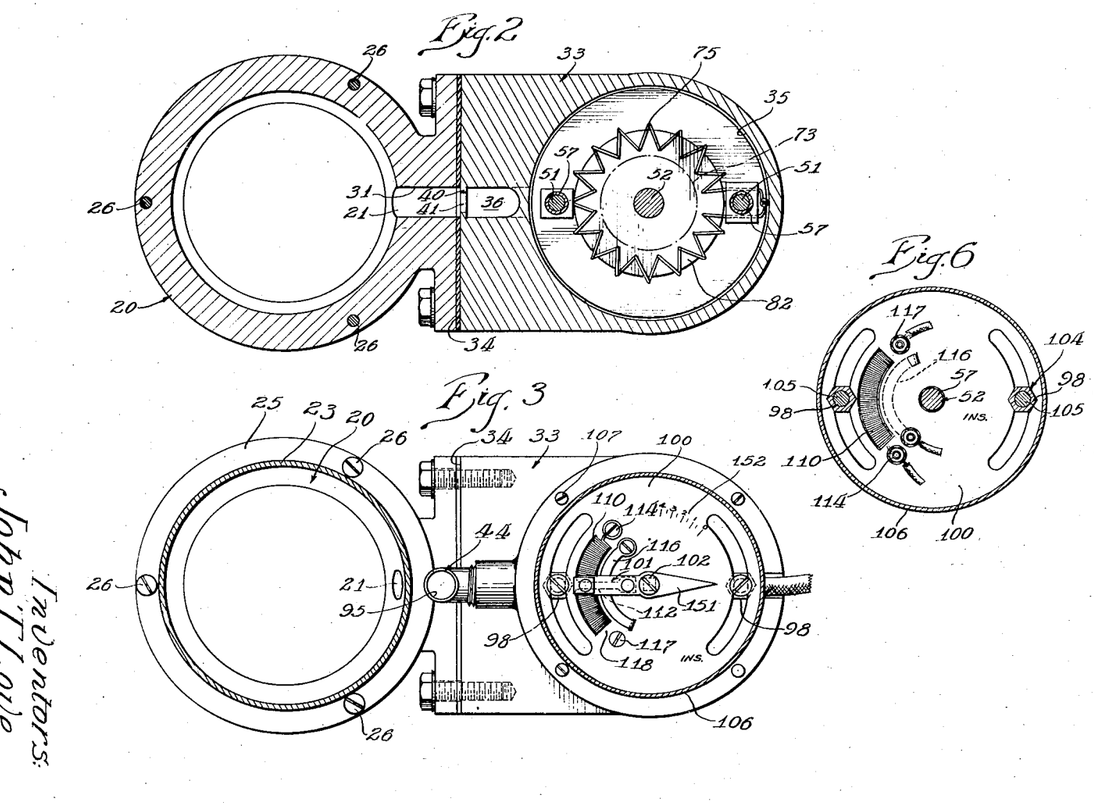
Fig. 2 is a section taken on the lines 2—2 in Fig. 1.
Fig. 3 is a section taken on the lines 3—3 in Fig. 1.
Fig. 6 is a section taken on the lines 6—6 in Fig. 1.

As shown in Figs. 3 and 6, the insulating member 100 is mounted upon nuts 98 for adjustable rotation relative to the arm 101 by screw and slot assemblies 104, it being merely necessary to loosen the screws 105 to change the position of the insulating member 100 relative to the position of the arm 101. A cover 106 is secured to the end 46 by screws 107 to protect the parts just described which extend beyond the end 46.

Figures 8, 9, 10, 11, 20:
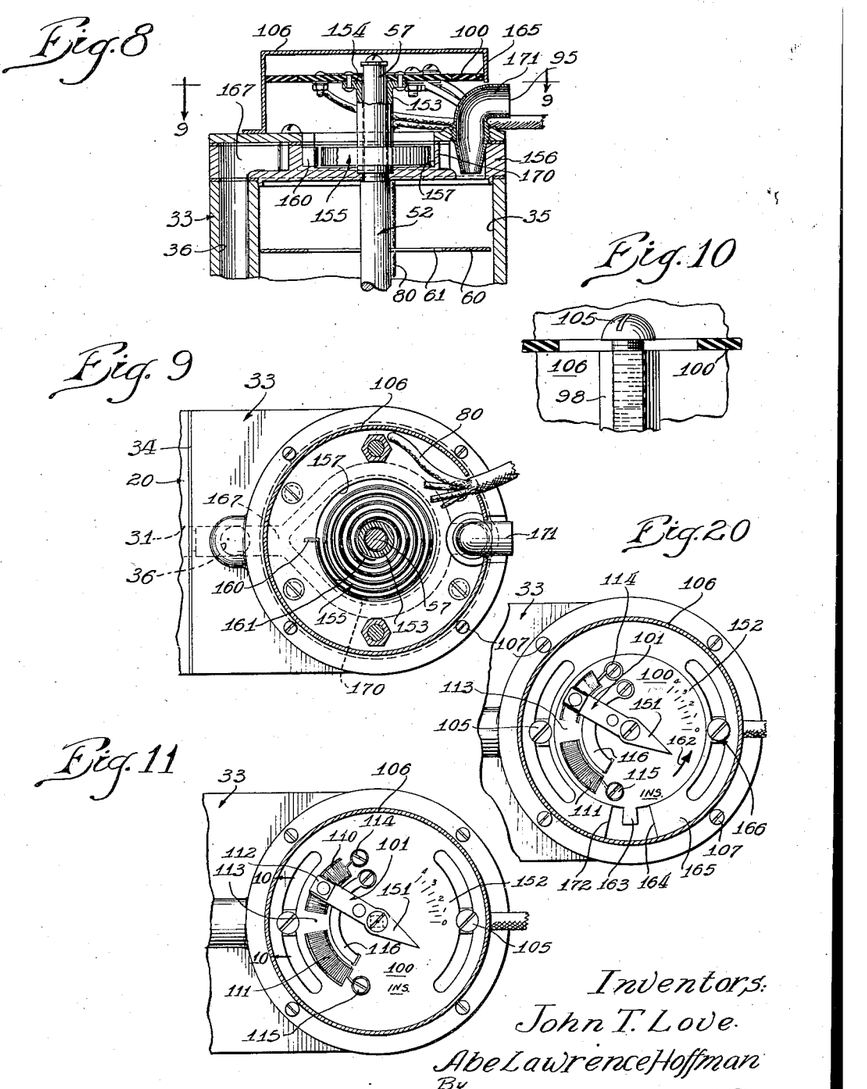
Fig. 8 is a section similar to Fig. 1 of a portion of another embodiment of the invention designed to supply the correct mixture for the warming up period of the engine.
Fig. 9 is a section taken on the lines 9—9 of Fig. 8.
Fig. 10 is a section taken on the lines 10—10 in Fig. 11 illustrating the means by which certain adjustments described hereinafter are made.
Fig. 11 is a fragmentary view similar to Fig. 3 showing the preferred modification of the switch control incorporated as part of the invention.
Fig. 20 is a view similar to Fig. 11 of a modification showing the preferred embodiment in Fig. 11 as constructed for use with the embodiment illustrated in Fig. 8.

As shown in Fig. 11, the preferred embodiment of the insulating member 100 is shown wherein two resistances 110 and 111 are mounted with their points of greatest resistance spaced slightly apart as at 113 to provide a dead center at which a contact 112 carried by the arm 101 may come to rest without engaging either of the resistances although with slight movement in either direction the contact 112 will engage one or the other of the resistances.

Resistance 110 is connected to the pole 114 and the resistance 111 is connected to the pole 115.

An arcuate contact element 116 engages contact 112 so that a circuit is completed through the contact 112 with either of the resistances depending upon the movement of the arm 101. The contact 112 and the engagement upon the contact element 116 is a light spring contact which creates just enough friction to keep the arm from vibrating, yet does not interfere with the positive action of the thermostats 62 and 84.

Although make and break contacts without resistance may be substituted for the resistances, it is preferred to use the resistance so that the amount of current flowing through the circuits is proportional to the degree of movement of the arm as controlled by the thermostats. In this way if there is a great deal of carbon monoxide being burned, the thermostat 84 will force the arm 101 to a position where there is little resistance 110 in the circuit. Whereas, where there is only a slight amount of carbon monoxide being burned, practically all of the resistance 110 is in the circuit. It will be appreciated that the range of the resistance both as to length and ohms may be determined in relation to the movement of the arm 101, taken in conjunction with the operation of the devices, to be hereinafter described, that are controlled by the resistances to provide for a straight line function or any degree of lag either way.

In the embodiment illustrated in Fig. 3 a contact 117 is substituted for the resistance 111 and the dead center for the arm 101 is indicated by the numeral 118.

Figure 12:
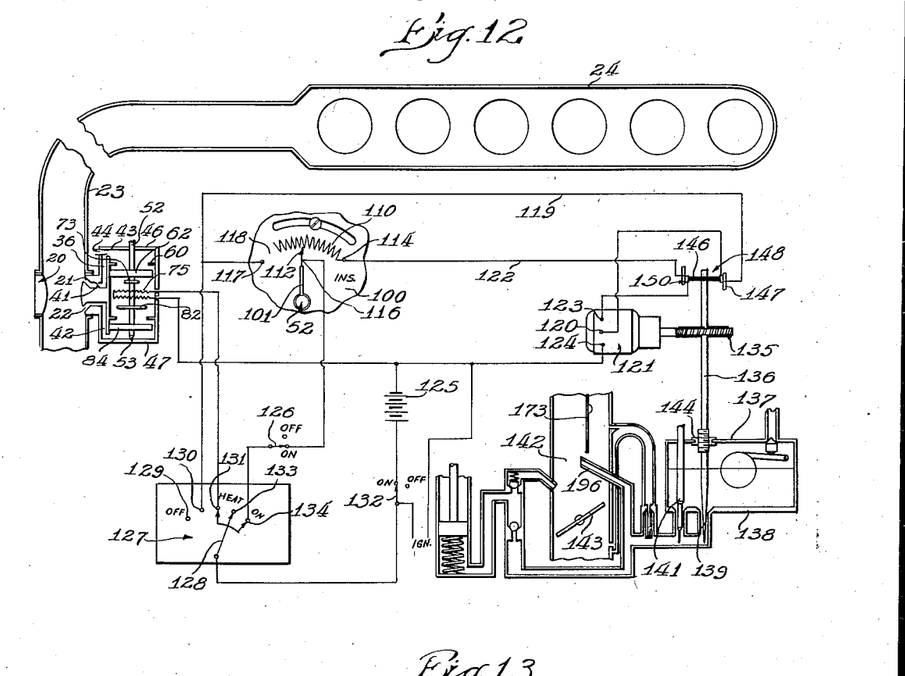
Fig. 12 is a schematic drawing of the complete system including the electrical circuit constructed according to the preferred embodiment of the invention with the control portion that is shown in Fig. 3 being located, for convenience of disclosure, to the right of the schematically shown analyzing portion taken from Fig. 4.

Referring now to Fig. 12 which is an illustration based upon the embodiment of resistances shown in Fig. 3, the contact 117 is connected in the circuit 119 leading to the reversing pole 120 of a motor 121. The pole 114 is connected in a circuit 122 with the forward winding 123 of the motor 121. The third pole 124 of the reversible motor 121 is connected in circuit with a battery 125 or other suitable means of electrical power and the ignition switch 132.

The contact 116 is in circuit with the battery 125 through a manual make and break switch 126 and a triple contact, five pole, three position switch 127.

While the exact construction of the switch 127 is somewhat immaterial, the operation thereof and the objects accomplished thereby will be better understood by pointing out that the movable arm 128 engages three of the five contacts simultaneously. Reading from left to right, the first contact 129 is a dead one, the second contact 130 is in circuit with the reversing circuit 119 along with the contact 117. The third contact 131 energizes the coil 75 and whenever the switch 126 is "on," this circuit is constantly closed so that the coil 75 will be continuously heated whenever the ignition switch 132 of the engine is "on." The fourth pole 133 is dead and the fifth pole 134 is in circuit with the contact arm 101.

In order to understand the operation of these circuits it would be well to point out at this time that under certain conditions it is desirable to have a quick richening of the mixture for emergency conditions, whereas a quick leaning of a mixture, which is not too wet to burn, is seldom needed. The motor 121, when actuated forwardly, drives a worm and gear reduction 135 that rotates a shaft 136 threaded in the float bowl 137 of a carburetor 138. Rotation of the shaft forwardly moves the needle valve 139 on the end of the shaft into the flow orifice 140 in cooperation with the throttle valve 141 to reduce the amount of fuel flowing into the intake 142 to lean the resulting mixture entering the engine past the main throttle valve 143. When the shaft 136 is rotated in the opposite direction of its threaded couple 144 the needle valve 139 is retracted and the amount of fuel flowing from the needle valve 147 in proportion to the air flowing through the intake 142 is increased, the resulting mixture being richer.

Driving the motor forwardly by energizing the forward winding 123 thereby operates to lean the mixture gradually. Driving the needle valve in the reverse direction by closing the circuit with the pole 120 retracts the needle valve and richens the mixture.

In view of the fact, as already disclosed, it is more desirable to have a quick richening control than a quick leaning control, the reversing pole 120 is connected to the contact 130 so that when the arm 128 is moved away from the contact 134 the circuit through the arm 101 is broken and any possibility of closing the forward circuit is removed and the reversing circuit is brought into immediate full operation.

Thus, when it becomes necessary to richen the mixture, the pilot or chauffeur, by employing the switch 128, quickly places the engine under operation free of the fuel economizer and richens the mixture promptly.

A device is provided which prevents the motor from withdrawing the needle valve 139 more than a predetermined amount. This constitutes a switch 148 which is closed whenever the contact carried by the cross head 146 upon the shaft 136 is lowered, the contact member 147 of the switch 148 being adjustable longitudinally with the shaft 136 so that the make and break point of the switch may be set at a predetermined point.

Thus, whenever there has been a leaning movement of the rod 136, the switch 148 is closed and kept closed through all further leaning movement of the shaft 136. When reversal of the motor takes place through the circuit 119 from the continued closing of the contact 130 this circuit through the switch 148 is broken, as the shaft 136 is lifted, to stop the motor's reverse movement at one limit so that the mixture is not made too rich.

A switch 150 similar to 148 is provided in the forward circuit 122 to break the circuit at one extreme limit of a forward movement of the shaft 136 so that dangerously lean mixtures are avoided if anything in the circuit fails to function. This point of breaking of 150 is preferably upon the lean side of perfect combustion, leaving the device to work up to a perfect combustion without the contact at the switch 150 being broken.

When the ignition switch 132 is turned "on" with the switch 128 at its "off" position, contacts 130 and 131 are connected with the battery 125. Contact 131 heats the coil 75, and the contact 130 closes the circuit 119 through the switch 148 to reverse the motor until the switch 148 is broken, at which time the carburetor is prepared for starting with a full rich mixture. The motor 121 will act promptly in this instance because there is no resistance in the circuit controlling the reverse winding under these conditions. After the engine is started there will be carbon monoxide present in the exhaust gases due to choking and the rich mixture provided by the carburetor, and the heat of the exhaust gases passing over the thermostats 62 and 84 will position the arm 101 upon the resistance 110 at a position proportional to the amount of carbon monoxide present in the exhaust if the air opening 95 which supplies the oxygen to the exhaust gases is open. However, before the main control switch 128 is moved to the position shown in Fig. 12 and after the motor is warmed up, the initial setting for normal conditions of operation may be made by closing the opening 95 and then moving the insulated plate 100 to place the arm 101 at dead center relative to the contact 117 and the resistance 110. Thereafter with the air opening 95 still closed the switch 128 can be moved to the position shown in Fig. 12 and the air opening 95 released. Immediately upon the admission of oxygen to the exhaust gases carbon monoxide will start to burn and the arm 101 will swing into contact with the forward resistance coil 110 to remove resistance from the circuit 122 in proportion to the degree of carbon monoxide present in the exhaust gases.

In either instance whether the economizer is put into operation right away or after adjustment, the forward pole 123 of the motor 121 is energized the moment the contact arm 101 comes in contact with the resistance 110 and the speed of the motor forwardly will be progressively increased as the arm 101 moves across the resistance 110 until such time as the adjustment of the needle valve 139, induced by the forward turning of the motor, leans the mixture to reduce the carbon monoxide content of the gas enough for the thermostat 84 to cool and permit the arm 101 to be driven progressively from contact with the resistance 110 by the thermostat 62.

In this connection it will be well to note that the gear ratio and the speed of the motor as determined by the resistance 110 is so determined that movement of the needle valve 139 will be slow enough that the thermostat 84 will have time to dominate and control the movement thereof in relation to the time that it takes for the combustible mixture to be made up in the carburetor, drawn into the engine, burned for power and reburned for carbon monoxide content.

In this way the leaning effect of the needle valve 139 is kept from overrunning the control exerted by the thermostat 84. Thus, as the arm 101 gradually moves towards it normal position the speed of the motor 121 slows with the increased resistance provided at the resistance 110 until such time as the arm 101 reaches its dead center which has been adjustably determined as already explained. Thereafter the engine will continue to operate under the degree of combustion perfection determined upon by the setting of the insulating plate 100.

It has been mentioned that the embodiment of the invention illustrated not only can be adjusted to maintain a perfect mixture but can also be adjusted to maintain any degree of deviation therefrom.

As illustrated in Fig. 3, the arm 110 has an indicator 151 thereon and a graduated scale 152. When the air opening 95 is closed and the arm 101 has reached its level indicating that the thermostats 62 and 84 have attained their relative setting as though no carbon monoxide was present, the insulating plate 100 may be moved so that the indicator 151 points to "0" if perfect combustion is desired or to any one of the other numerals on the scale 152, depending upon the degree of carbon monoxide tolerance desired.

As shown in Fig. 11 the adjustment is for perfect combustion. After the opening 95 is again opened to permit oxygen to be mixed with the exhaust gas the arm 101 will move into contact with the resistance 110 to lean the mixture down to the point where the arm 101 breaks with the resistance 110. If this break is adjusted to take place with 1% carbon monoxide content the motor 121 will be removed from leaning operation when the 1% is reached and if at no time the carbon monoxide varies from the 1% the arm 101 will remain unchanged in position. If the carbon monoxide content falls below 1%, due either to change of operation in the engine or load characteristics thereof, the arm will contact the reversing contact in Fig. 12 or the reversing resistance 111 in Fig. 11 to reverse the motor. In this way any degree of combustion perfection is automatically maintained after the device is set or adjusted for that degree in relation to any particular engine upon which it is installed.

Referring now to Figures 8, 9, 10 and 20, a modification of the embodiment already described is illustrated, wherein a means is employed to vary or supplement the relative adjustment between the arm 101 and resistance 111 during the warm-up period of the motor at a time when a relatively rich mixture is desired.

A sleeve 153 is rotatably mounted upon the reduced portion 57 of the shaft 52 and the insulating plate 100 is secured relative to the sleeve 153 by a flange and riveted assembly 154. A spiral thermostat 155 is mounted on the head 156 in the depression 157 with the outer end 160 fixed to the head 156 and the inner end secured to the sleeve as at 161. The thermostat 155 is so disposed as to rotate, when heated, the insulating plate 100 in the direction 162. This direction is reverse to the movement of the arm 101 when the arm 101 is moved by the presence of carbon monoxide in the gases. Movement of the insulating member 100 in the direction 162 will be permitted until the projection 163 thereon comes into contact with the shoulder 164 which is carried upon an adjustable ring 165. Adjustment of the ring 165 is accomplished by means of a slot and clamp assembly 166 and the position at which the projection 163 and the shoulder 164 come into contact with each other is that position which determines the relative adjustment between the arm 101 and the resistances 110 and 111 as related to the degree of carbon monoxide for which the device is set to control.

The thermostat 155 is subjected to the heat of the exhaust gases before the air is mixed therewith. In order to accomplish this, the head 156 is made preferably of aluminum and has a branched conduit 167 which conveys the hot gases of combustion from the passageway 36 in the casting 33 to heat the thin wall 170 of the depression 157, after which the hot gases of combustion are mixed with air from the elbow 171.

With this construction, when the motor is cold, the projection 163 moves into contact with the shoulder 172 opposite the shoulder 164 in which location the arm 101 is brought positively into contact with the motor reversing resistance 111. The motor 121 will reverse until the dead center for the arm 101 regulates the degree of starting richness desired, switch 148 being so adjusted as to permit this, and as the engine warms up the thermostat 155 will act to move the insulating member 100 so as to bring the arm 101 into contact with resistance 110 until the projection 163 engages the shoulder 164.

In this way the action of the choke valve 173 is supplemented and once the engine begins to run the choke valve can be removed from operation either by a vacuum couple or other suitable means well known in the art, the thermostat 155 being so designed as to provide the proper series of combustion ratios during the warm-up period. In this way the warm-up mixture regulating function imposed upon the choke in conventional carburetors is divorced from the choke to permit the absolute regulation of the fuel and air mixture to be more accurately determined and controlled by the carburetor as a definite part of its function.

This is of particular significance in view of the fact that conventional carburetors are designed to deliver a predetermined amount of fuel in direct relationship with the air passing by the venturi thereof for normal running conditions. In the warm-up period this predetermined ratio has to be unbalanced towards richness and in order to accomplish this the choke, conventionally, is kept from fully opening in order to create a vacuum condition above the throttle valve which will draw a greater proportion of fuel from the float bowl per volume of air passing the venturi. In order for a choke valve to operate for this purpose with proper efficiency, a correct relationship between the position of the main throttle valve and the choke valve must be maintained. This is important because the vacuum relied upon to accomplish the increased flow of fuel from the fuel bowl is the vacuum that is normally confined and controlled by the main throttle valve. If the main throttle valve is wide open with the choke partly closed a flood of excess fuel will be drawn into the manifold and will stall the engine. The converse is equally difficult, if the choke is too far open for a given position of the throttle valve; the engine will be hard to start. Thus, conventionally, the balance between the choke valve and main throttle valve must be a delicate one, and, furthermore in order to avoid complex arrangements to take care of wide varying engine speeds the balance is restricted for best operation to a very low engine running speed although some carburetors have interconnections between the main and choke valves to open the latter when the main valve is approximately wide open.

In the present invention, on the other hand, once the choke valve has induced the starting of the engine, the choke valve may be removed absolutely from operation, the mixture supplied to the engine for the warming up period being automatically and positively regulated to take care of all steps at which an engine may be warmed up without the carburetor balance being upset by excess vacuum conditions imposed upon it by the choke valve operating in conjunction with the throttle valve. Once the engine is started the proper mixture is supplied regardless of the opening of the main throttle valve. In fact it is possible with the present invention to start the engine without a choke valve if a quick closing fuel dumping valve is employed to supply the necessary excess of fuel needed to start the engine, the closing being timed or controlled to take place when the engine begins to run; the present invention thereafter supplies the warming up fuel mixture regardless of the speed at which the engine warms up.

Figures 13, 19:
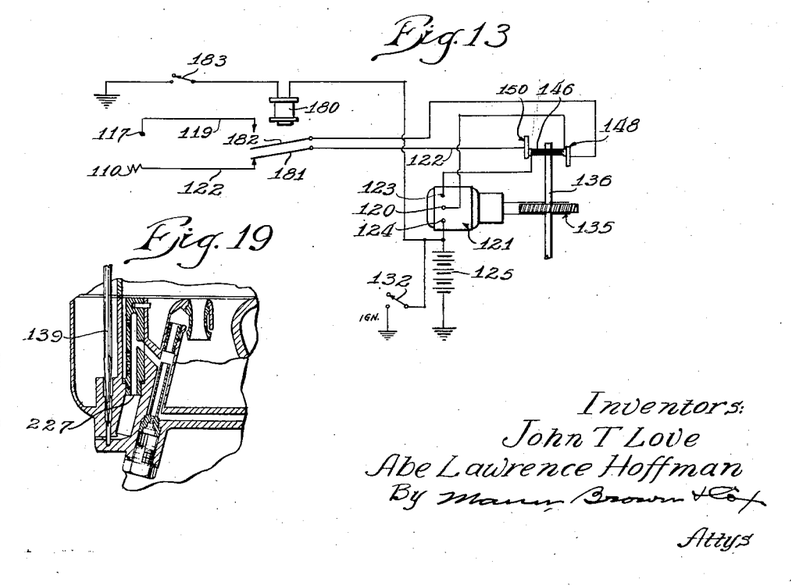
Fig. 13 is a diagrammatical view of another electrical circuit illustrating a modification of the electrical circuit shown in Fig. 12.
Figs. 16, 17, 18 and 19 are vertical sections through carburetors having various working principles showing several modifications for varying the proportion of the combustible elements in the mixture to be delivered to the engine.

In Fig. 13 a control for the motor 121 is shown which is a modification of the electrical control shown in Fig. 12. A solenoid 180 is employed to operate a normally closed switch 181 in the circuit 122 and a normally open switch 182 in the circuit 119 whereby the shaft 136 can be reversed temporarily at will by manually closing the normally open switch 183 to energize the solenoid 180. In this way an over-riding control for the arm 101 is provided so that the motor 121 may be reversed to richen the mixture at will and then returned to the control of the arm 101. This provides a manually controlled safety factor which can be brought into operation if at any time the pilot of an aeroplane or a chauffeur feels, for any reason, that the mixture is not rich enough for the conditions existing or expected to take place at any given time and also provides a means for tickling the operation of the device if it is desired to do so.

Figures 14, 15, 18:
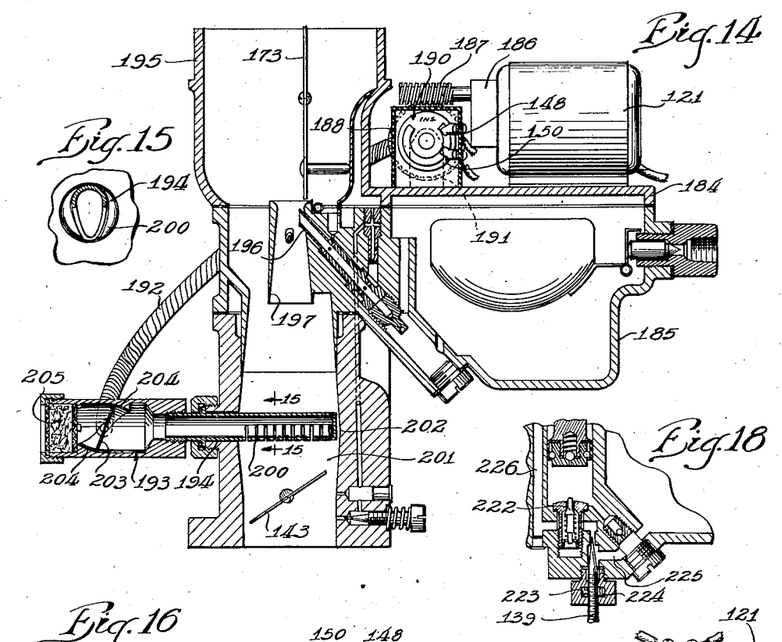
Fig. 14 is a vertical section through a carburetor illustrating the preferred construction by which either of the embodiments shown in Figs. 12 and 13 may be utilized with a carburetor for varying the proportion of the combustible elements in the mixture delivered to the engine.
Fig. 15 is a section taken upon the lines 15—15 in Fig. 14.

Referring now to Fig. 14, a preferred embodiment is shown of the means by which the air and fuel proportion of the combustible mixture is determined, a reversing motor 121 is mounted upon the cap 184 of the float bowl 185 and through a reduction gear housing 186 drives a worm gear 187 with a worm wheel 188. The worm wheel carries an insulating member 190 upon which the contact switches 148 and 150 are located. A bracket 191 supports the worm gear train and a flexible shaft 192 is connected to the worm wheel and driven thereby. The worm gear serves also to lock the wheel at any position at which the motor 121 is stopped.

The flexible shaft 192 is connected with an auxiliary air inlet 193 opening above the main throttle valve 143. A tube 194 having a streamlined cross sectional contour, shown in Fig. 15, is inserted into the path of air of the down draft carburetor 195 below the fuel nozzle 196 and the venturi 197.

Upon the lower side thereof the tube 194 is slotted transversely as at 200 at spaced intervals to permit air to flow through the tube into the intake passage 201 of the carburetor where the intake passageway is enlarged as at 202 sufficiently to permit the volume of air flowing therethrough to be unhampered by the presence of the tube 194 therein. In this way raw fuel striking the tube 194 flows over the surface thereof and is picked up by air flowing through the slots 200 whenever air is supplied thereto if the mixture is too rich. Such constitutes a desirable homogenizing agency to improve combustion in the engine.

A butterfly valve 203 driven by the flexible cable 192 is mounted to move between two surfaces of revolutions 204 designed to provide a slightly increased air opening with substantially large movements of the valve. The surfaces of revolution shown have a radius appreciably larger than the radius of the valve and a volumetric efficiency which is a straight line function in relation to the degree of movement of the valve. The air is drawn in through the filter 205.

This particular construction is advantageous for aeroplane installation where the rareness of air at higher altitudes reduces the power of the engine. With the device illustrated, the fuel supply is maintained and more air is supplied to provide the degree of combustion perfection desired.

Figures 16, 17:
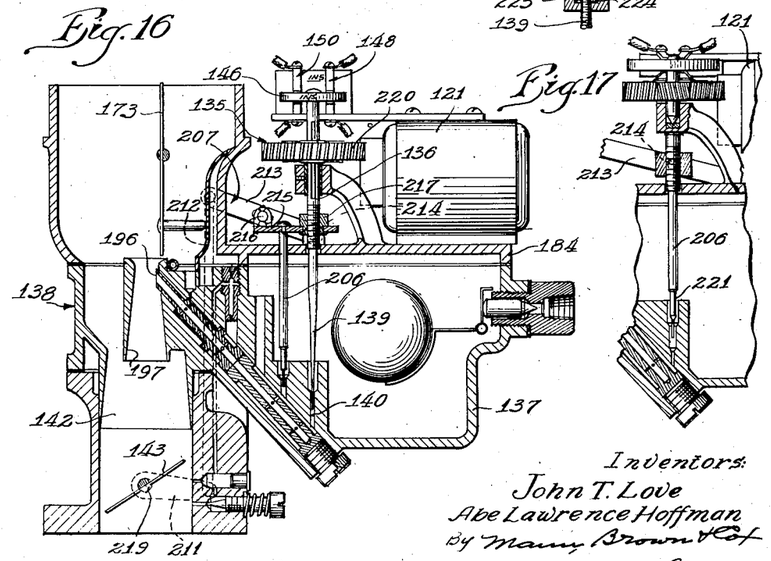

In Fig. 16 the needle valve 139 is mounted and movable with the needle valve economizer 206 through a suitable leverage linkage 207 connected with the main throttle as at 219 whereby as the throttle valve 143 is moved counter-clockwise, the arm 211 and thrust link 212 move the lever 213 clockwise about the pivot point 214 with a yoke 215 carrying the valves 139 and 206 pivotally secured to the arm 213 at 216.

The relative positions of the needle valves 139 and 206 are adjustably varied by the motor 121 rotating the shaft 136 in a threaded couple 217 upon the yoke 215. A keyed sliding relation between the worm wheel 220 and the shaft 136 permits movement of the shaft 136 in conjunction with the valve 206 free of the weight of the motor 121 and gearing. The contacts 148 and 150 are shown carried by the yoke 215. In this particular embodiment of the size and shape of the needle valve economizer is reduced to permit the fuel controlled by the needle valve 139 to be present without unduly richening the mixture except in the case of the thermostatically controlled embodiment illustrated in Fig. 8. In any event, the needle valve economizer 206 is so constructed and arranged that it and the carburetor alone do not furnish quite enough fuel to provide a perfect combustion and it is through the adjustment of the valve 139 as controlled by the motor 121 that sufficient fuel is supplied to provide a combustible mixture or any degree of richness thereof within the limits designed for the function of the valve 139 as hereinbefore described either for merely regulating the combustible mixture after the warm-up period or for regulating the mixture during the warm-up period, or both.

In Fig. 17, the embodiment illustrated in Fig. 16 is modified wherein the needle valve economizer 206 itself is adjusted by the motor 121 or in other words the valve 139 is shaped and conformed as at 221 to serve as a needle valve economizer in a conventional carburetor.

In Fig. 18 the invention is shown as employed with an economizer by-pass valve 222 wherein the threaded couple for the valve 139 is indicated at 223 with a packing 224 therethrough to prevent leakage of fuel. The valve controls a passageway 225 which by-passes the economizer by-pass valve 222 and permits fuel supplied to the pump discharge passageway 226 to be drawn into the venturi in addition to and supplemental to a correspondingly restricted supply of fuel normally supplied through the main metering jet (not shown).

In Fig. 19 the valve 139 is employed to supplant the compensator normally located at 227 in the main and compensating jet carburetors, as indicated in broken lines. In this particular construction the power jet is unaffected so that at high speeds the engine may be supplied with the necessary surcharge of fuel independently of the needle valve 139 since in this case the adjustment of the contact 150 in the circuit controlling the motor 121 is such as to break and stop the forward movement of the motor when a certain lean relationship is attained by the valve 139.

With the embodiment shown in Figs. 17 and 19, the valve 139 replaces fuel valves already present in the conventional carburetors, while in Figs. 12, 16 and 18, the valve 139 supplements the metering valves present in the conventional carburetors. In the last instance, as already pointed out, it is desirable that the metering valves, other than the valve 139, be reduced in their capacity to such an extent that if they were relied upon by themselves they would not provide a combustible mixture. Furthermore, it will be seen that in Fig. 16 where the contacts 148 and 150 are rigidly mounted, the motor 121 can be removed from operation at engine idling speeds or at high speeds. Where fuel economy is not desired and more fuel is needed in proportion to the air than at normal running speeds it will be appreciated that rather than have the contacts constructed as they are in Fig. 16, it is possible to break the respective circuits of the forward and reverse winding of the motor by other and suitable means whenever the engine idles or is operating at minimum speed.

Consequently, although several embodiments of the invention have been shown and described herein it will be readily apparent to those skilled in the art that various and other changes can be made without departing from the substance and spirit of the invention, the scope of which is commensurate with the appended claims.

What is claimed is:

1. An internal combustion engine comprising a combustion chamber subjected to varying work conditions and to varying atmospheric conditions, means for supplying a mixture of fuel and air to the chamber, means for mixing a portion of the exhaust gases from the combustion chamber with air, means for igniting the exhaust gases and air and reburning them to produce heat, means for measuring the temperature of the gas and air mixture before and after burning to register a temperature differential including thermostats subjected to engine vibration and mechanically cooperating with each other, and means controlled in relation to the temperature differential registered for controlling the fuel and air mixture.

2. In an exhaust gas analyzer, where exhaust gases are reburned, a temperature responsive device subjected to the heat of the exhaust gases before reburning, a heat producing device for igniting the gases, a temperature responsive device subjected to the heat of the gases after reburning, and means for indicating the differential between the temperature responsive devices exclusive of the heat added by the heat producing device, the last means including an adjustable member and a device for interrupting said reburning.

3. In an exhaust gas analyzer reburning gas, indicating means, a shaft connected to the indicating means, a thermostat predisposed to turn the shaft in one direction in response to the temperature of the gas before reburning, a thermostat predisposed to turn the shaft in the opposite direction in response to the temperature of the gas after burning, and loose connection means removing the shaft from the control of the thermostats when the temperatures are within a predetermined range.

4. In a fuel economizer, means for supplying a combustible mixture of elements in a predetermined proportion, means responsive to the presence of carbon monoxide in the products of combustion of the mixture for controlling the mixture supplying means to vary the proportion of elements and attain a predetermined degree of perfect combustion, and means operative during a predetermined period of supply for providing a richer mixture of elements than that required for said degree of perfect combustion.

5. In an internal combustion engine subjected to varying work conditions, means supplying the engine with a combustible mixture of elements in predetermined proportions, means responsive to the presence of carbon monoxide in the products of combustion of the mixture for controlling the mixture supplying means to the mixture in relation to the presence of carbon monoxide, and means operative during the warming up period of the motor in association with the responsive means to provide a rich and progressively leaning mixture necessary for warming up the engine.

6. The method of controlling the degree of perfection of combustion in an internal combustion engine comprising diverting exhaust gases from the engine and mixing them with oxygen, igniting the resulting mixture, testing the mixture before and after ignition to provide a differential, interrupting the supply of oxygen, normalizing the supply of combustible mixture to the engine during said interruption, re-establishing said oxygen supply, and varying the proportion of fuel and air supplied to the engine in relation to said differential.

7. The method of controlling combustion in an internal combustion engine comprising diverting exhaust gases from the engine and mixing them with oxygen, igniting the resulting mixture by heat, testing the mixture before and after ignition to provide a temperature differential, converting the temperature differential into mechanical movement proportional in degree to said temperature differential, controlling an independent source of power with the mechanical movement, and varying the proportion of fuel and air supplied to the engine by the controlled source of power.

8. The method of controlling combustion in an internal combustion engine comprising diverting exhaust gases from the engine and mixing them with oxygen, igniting the resulting mixture, testing the mixture before and after ignition to provide a temperature differential, converting the temperature differential into mechanical movement, controlling an independent source of power with the mechanical movement, and varying with a delayed action the proportion of fuel and air supplied to the engine by the controlled source of power.

9. An internal combustion engine comprising a combustion chamber, a carburetor supplying the mixture of fuel and air to the combustion chamber, means for conducting exhaust gases from said chamber, means for withdrawing a portion of the exhaust gas from the exhaust means and mixing it with air, a catalytic heat producing element for igniting the air and exhaust gases, temperature responsive means upon opposite sides of said heat producing element responsive to the temperature of the gas and air mixture before and after burning including a shaft actuated by said temperature responsive means for movement in relationship to the temperature differential between the temperatures of the gas and air mixture before and after burning, and means controlled by said shaft to adjust the carburetor gradually over a period of time including an element regulating the action of the carburetor at a retarded rate of change in mixture richness as the temperature differential decreases.

10. The method of controlling combustion in in internal combustion engine comprising diverting a stream of flowing exhaust gases from the engine and mixing the stream with oxygen, igniting the resulting mixture, testing the mixture before and after ignition to register a temperature differential, and progressively varying the proportion of fuel and air supplied to the engine in relation to said differential at a rate slower than that required for the making of a test.

11. The method of controlling combustion in an internal combustion engine comprising diverting exhaust gases from the engine and mixing them with oxygen, igniting the resulting mixture, testing the mixture before and after ignition to register a temperature differential, biasing the test in relationship to the relative heat of the engine to vary the differential registered, and varying the proportion of fuel and air supplied to the engine in relation to said biased differential.

12. The method of controlling combustion in an internal combustion engine comprising diverting exhaust gases from the engine, passing the exhaust gases over an incandescent element, testing the temperature of the gases before and after they pass over said element, normalizing the test to exclude any temperature added by the incandescent element, thereafter supplying the exhaust gases with oxygen before the test and varying the proportion of fuel and air supplied to the engine in relation to any differential of temperature existing in the test before and after ignition of the exhaust gases and oxygen.

13. An internal combustion engine comprising a combustion chamber subjected to varying work conditions and to varying atmospheric conditions, means for supplying a mixture of fuel and air to the chamber, means for mixing a portion of the exhaust gases from the combustion chamber with air, means for igniting the exhaust gases and air and reburning them to produce heat, means for measuring the temperature of the gas and air mixture before and after burning to register a temperature differential, and means including an electrical circuit controlled in relation to the temperature differential registered in proportion to the magnitude of said differential for controlling the fuel and air mixture at a rate of adjustment varying with the amount of temperature differential.

14. In an internal combustion engine, means supplying the engine with elements making up a combustible mixture, means for determining the quantity of carbon monoxide present in the exhaust gases of the engine, including a plurality of temperature responsive members responsive in direct relationship to the heat of combustion of the carbon monoxide content of said products, means controlled by said members for registering said temperature differential to a degree corresponding to the variation of the differential for altering the proportion of said elements including a resistance coil for a control circuit progressively shunted in relationship to the degree of said temperature differential.

15. In a motor vehicle, an internal combustion engine having a carburetor including a throttle valve and an exhaust manifold, a conduit for removing a portion of the exhaust gases from the manifold when the engine is in operation, a housing having a chamber therein connected to said conduit to receive said portion of exhaust gases, means for admitting air into the chamber to mix with said portion, a shaft in said chamber mounted for rotation and vibration, spaced thermostats controlling rotation of the shaft, means for burning the air and exhaust gas mixture at a point intermediate the thermostats, an air bleed for the carburetor comprising a member disposed upstream the air draft through the carburetor with respect to the throttle valve, said member being located in the path of the fuel and air draft for turbulating the air without appreciable blockage, means for admitting varying quantities of air through the member to vaporize raw fuel entering the engine, means for controlling said last means including a device controlled by movement of said shaft for progressively restricting the amount of air admitted through said member to an amount less than that necessary to provide the desired combustion ratio at a given time of control.

16. In an exhaust gas analyzer where exhaust gases are reburned, a temperature responsive device subjected to the heat of the exhaust gases before reburning, means for heating and igniting the gases after the temperature responsive device has been subjected to the heat of the exhaust gases, a temperature responsive device subjected to the heat of the gases after reburning, means controlled by said temperature responsive devices for registering the differential between the temperature responsive devices, means for varying the degree to which the increment of temperature due to the heating of the gases enters into said registry including an adjustable member and a device for interrupting said burning.

17. An internal combustion engine comprising a housing member through which portions of exhaust gases from the engine are passed, means for introducing air into said chamber to mix with said portions of exhaust gases, a temperature responsive device subjected to the heat of the mixture, means for heating and igniting the mixture, a temperature responsive device subjected to the heat of the mixture after burning, means controlled by said temperature responsive devices for registering the differential between the temperature responsive devices, means for varying the degree to which the increment of temperature due to the heating of the mixture enters into said registry including an adjustable member and a device for changing the supply of air to the chamber, a carburetor, and means controlled by said controlled means for varying the portions of fuel and oxygen entering said engine.

18. In a device of the class described for use with an internal combustion engine having a combustion chamber subjected to varying work conditions, a carburetor for supplying an explosive mixture of fuel and oxygen to the combustion chamber to provide ergs including means for varying the proportions of fuel and oxygen supplied, means for remixing a portion of exhaust gases from the combustion chamber with oxygen, means for igniting the exhaust gases and oxygen mixture to burn combustibles therein, means for measuring the temperature of the exhaust gases and oxygen before and after burning to register a temperature differential including temperature responsive devices, a driving device for controlling the carburetor to vary the fuel oxygen proportions, means controlled by said registered differential for controlling said driving device including electric circuits for operating the driving device in opposite directions alternatively and an element controlling the driving device in one direction to vary the portions of fuel and oxygen in relation to the temperature differential at a rate less than that needed to remove the differential before succeeding differentials are registered, and means for actuating the driving device in the opposite direction at will.

19. In an internal combustion engine, means supplying the engine with elements making up a combustible mixture, means analyzing the products of combustion of the engine including elements responsive to temperature and working to register a temperature differential in relation to the carbon monoxide content of said products, means responsive to the temperature differential to a degree corresponding to the variation of the differential, and independently powered means controlled by said responsive means for altering the proportion of said elements in relation to said degree at a rate varying with the temperature differential.

20. An internal combustion engine comprising a combustion chamber subjected to varying work conditions, means for supplying the mixture of fuel and air to the chamber in relation to the work conditions to provide ergs, means for mixing a portion of the exhaust gases from the combustion chamber with oxygen including an extraneously heated element for reburning them to produce heat, means responsive to the temperature of the gas and air mixture before and after reburning to measure the temperature differential therebetween, means controlled by said responsive means to register said differential means for adjusting said controlled means to include from registration increments of said differential attributable to the heat added by the heat of said element, and means controlled by said controlled means to regulate the mixture supplying means.

ABE LAWRENCE HOFFMAN.
JOHN T. LOVE.